(12) United States Patent
Filippi et al.

(10) Patent No.: US 7,754,163 B2
(45) Date of Patent: *Jul. 13, 2010

(54) PSEUDO-ISOTHERMAL CATALYTIC REACTOR

(75) Inventors: Ermanno Filippi, Castagnola (CH);
Enrico Rizzi, Casnate Con Bernate (IT);
Mirco Tarozzo, Ligornetto (CH)

(73) Assignee: Methanol Casale S.A. (CH)

( * ) Notice: Subject to any disclaimer, the term of this patent is extended or adjusted under 35 U.S.C. 154(b) by 445 days.

This patent is subject to a terminal disclaimer.

(21) Appl. No.: 10/571,221

(22) PCT Filed: Aug. 30, 2004

(86) PCT No.: PCT/EP2004/009632

§ 371 (c)(1),
(2), (4) Date: Jan. 29, 2007

(87) PCT Pub. No.: WO2005/023411

PCT Pub. Date: Mar. 17, 2005

(65) Prior Publication Data

US 2007/0166210 A1 Jul. 19, 2007

(30) Foreign Application Priority Data

Sep. 10, 2003 (EP) .................................. 03020400

(51) Int. Cl.
*B01J 8/02* (2006.01)
*F28D 1/03* (2006.01)
*F28F 3/12* (2006.01)

(52) U.S. Cl. ................... 422/198; 422/200; 422/211; 166/145; 166/157; 166/170

(58) Field of Classification Search ................... None
See application file for complete search history.

(56) References Cited

U.S. PATENT DOCUMENTS

| 3,156,538 | A | * | 11/1964 | Schneider | 422/146 |
| 3,666,423 | A | * | 5/1972 | Muenger | 422/200 |
| 4,820,495 | A | | 4/1989 | Vu et al. | |
| 5,030,789 | A | * | 7/1991 | Dang Vu et al. | 585/503 |
| 6,419,892 | B1 | | 7/2002 | Schutte et al. | |
| 2006/0275190 | A1 | * | 12/2006 | Filippi | 422/200 |

FOREIGN PATENT DOCUMENTS

| EP | 1 153 653 A1 | 11/2001 |
| EP | 1 172 138 A | 1/2002 |
| EP | 1 221 339 A | 7/2002 |
| EP | 1 236 505 A | 9/2002 |
| EP | 1 279 915 A | 1/2003 |

* cited by examiner

*Primary Examiner*—Jennifer A Leung
(74) *Attorney, Agent, or Firm*—Akerman Senterfitt

(57) ABSTRACT

Pseudo-isothermal chemical reactor (1) for catalytic reactions with a vertical axis, comprising a substantially cylindrical shell (2), Closed at the opposite ends by upper (4) and lower (3) bottoms respectively, a reaction zone (8) in which a catalytic bed (11) and a plurality of flat, boxed, plate-shaped heat exchangers (12), having the shape of a parallelepiped and having long sides parallel to said vertical axis and short sides perpendicular to it, situated in said reaction zone and supported in an arrangement on parallel cords at a predetermined distance.

2 Claims, 3 Drawing Sheets

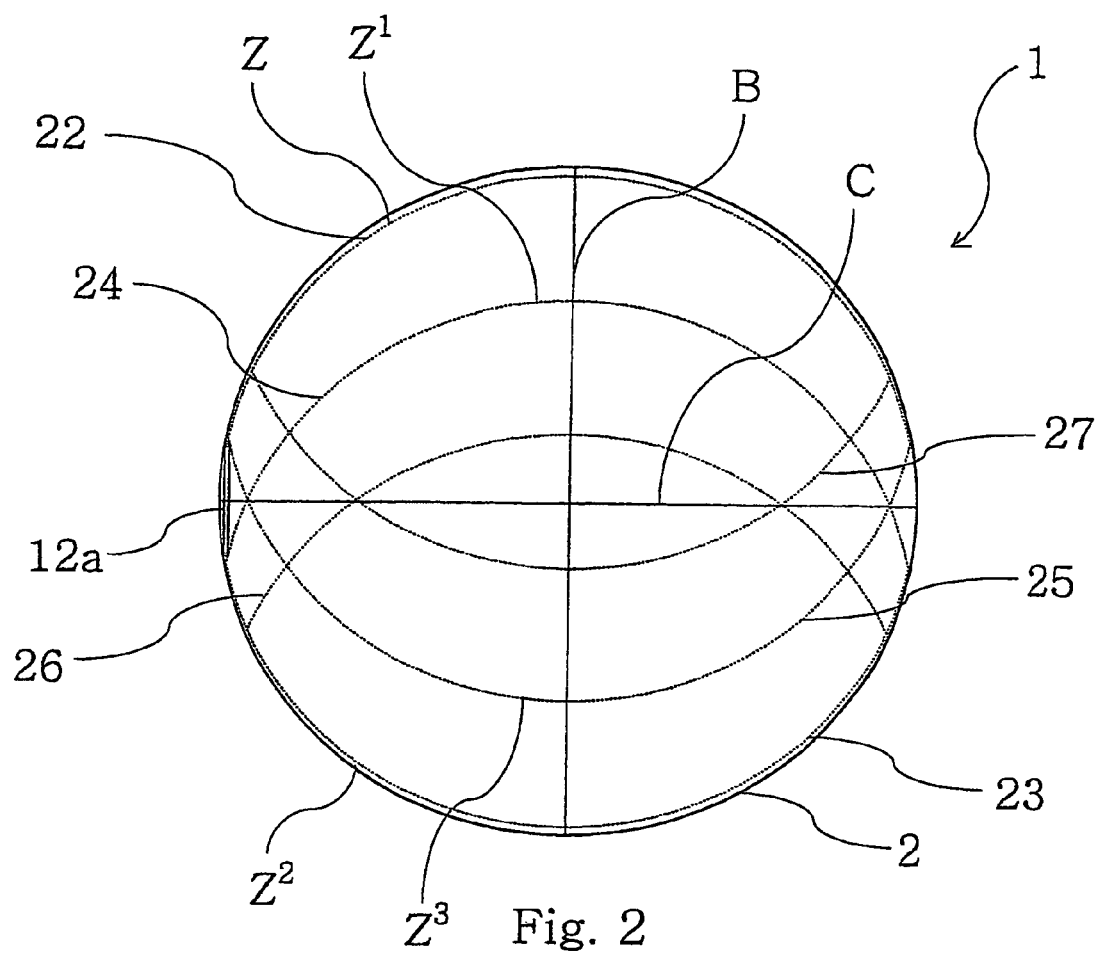
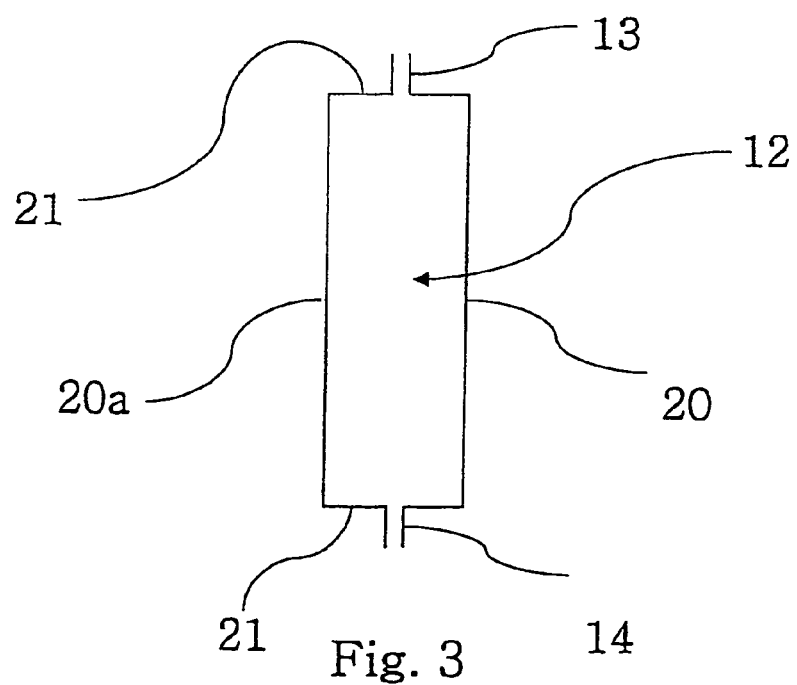

PSEUDO-ISOTHERMAL CATALYTIC REACTOR

FIELD OF APPLICATION

The present invention, in its most general aspect, refers to a pseudo-isothermal chemical reactor for catalytic reactions, comprising a substantially cylindrical shell closed at the opposite ends by respective bottoms, a reaction zone defined in said shell and in which at least one catalytic bed and a plurality of plate heat exchangers situated in said reaction zone are supported.

In the rest of the description and in the subsequent claims, with the term "pseudo-isothermal reactor" we mean to identify a reactor for chemical reactions in which the reaction temperature is controlled within a limited range of values around a predetermined optimal value.

In particular, the present invention concerns a reactor of the aforementioned type structured so that, with reference to the main axis of the reactor, the crossing of the reaction zone by the reactants and the reaction products takes place in the axial direction.

PRIOR ART

As is known, the control of the temperature at which a chemical reaction takes place is of great importance, since the performance and process yields of said reaction depend upon it.

Such control takes place by supplying or removing heat, in an appropriate way, to or from the environment in which said reaction is realized.

For such a purpose, heat exchangers crossed by an operating fluid responsible for the transportation of hear are widely used.

In the case of chemical reactors of the considered type (axial pseudo-isothermal reactors) heat exchange units consisting of a plurality of heat plate-shaped, boxed exchangers, embedded in a mass of catalyst are used.

Such heat exchangers are arranged on planes all parallel to each other and parallel to the main axis of the reactor, in order to control and make as uniform as possible to heat exchange between mass of catalyst and operating fluid.

An example of such chemical reactors is presented in document U.S. Pat. No. 4,820,495.

Although advantageous from various points of view, such heat exchange units have a serious and recognized drawback. Indeed, when one wishes to use the entire mass of catalyst as uniformly as possible in the heat exchange, as is generally required, such heat exchange units necessarily comprise different sized plated heat exchangers; for this reason, the production, the storage and the transportation of such exchangers is very laborious and not cost-effective, just as the assembly and operation of the heat exchange units of which they consist is also laborious and not cost-effective.

SUMMARY OF THE INVENTION

The technical problem underlying the present invention is that of devising a chemical reactor of the aforementioned type having structural and functional characteristics such as to allow effective control of the pseudo-isothermicity of the reaction realized in it, allowing at the same time the use of plated heat exchangers, all of the same size.

The aforementioned technical problem is solved by an axial pseudo-isothermal chemical reactor, comprising a substantially cylindrical shell, with vertical axis, closed at the opposite ends by upper and lower bottoms respectively, a reaction zone, defined in said shell and in which a catalytic bed and a plurality of flat, boxed, plate-shaped heat exchangers, having the shape of a parallelepiped and having vertical long sides and short sides parallel to a same diameter of the shell, are supported, characterized in that said exchangers are all identical and in that their short sides have the ends arranged on imaginary cylindrical surfaces having the same radius as the inner radius of the shell and centers all arranged on a same diameter of the shell.

Surprisingly, it has been found that, by arranging heat exchangers inside a reactor in the aforementioned way, it is possible to use exchangers all generally of the same size, thus solving the technical problem and overcoming the drawbacks of the prior art as described above.

Further characteristics and advantages of the invention will become clearer from the detailed description of an embodiment of a chemical reactor according to the invention, given hereafter with reference to the attached drawings, for indicative and non-limiting purposes.

BRIEF DESCRIPTION OF THE FIGURES

FIG. 2 schematically shows a horizontal section view of the chemical reactor of FIG. 1 without heat exchangers.

FIG. 3 schematically shows a vertical section view of a detail of FIG. 1.

DETAILED DESCRIPTION OF A PREFERRED EMBODIMENT OF THE INVENTION

Figure 1:
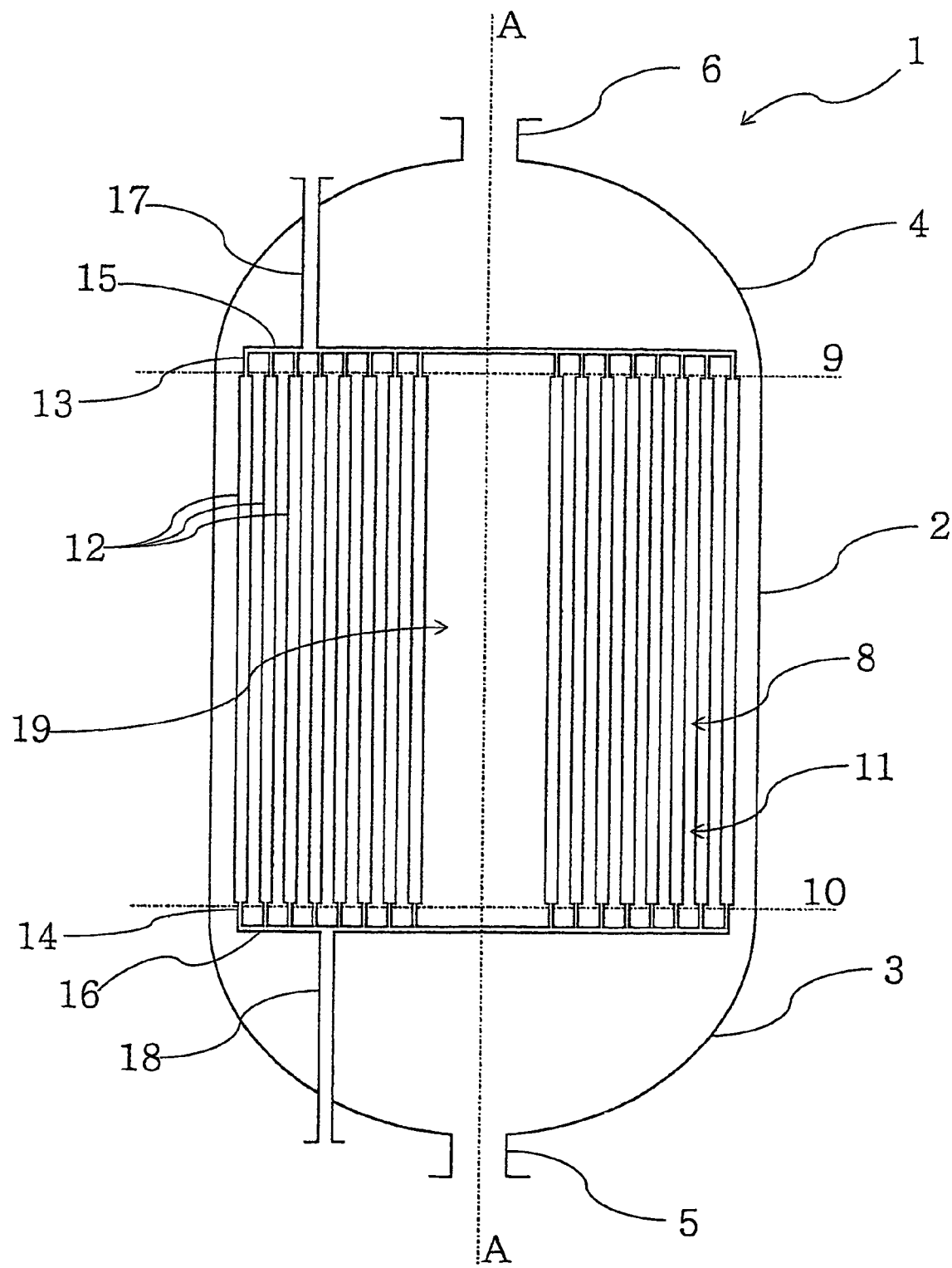
FIG. 1 schematically shows a vertical section view of a chemical reactor for realizing the invention.

With reference to FIGS. 1-4, an axial pseudo-isothermal chemical reactor, with a vertical axis A-A, comprising a substantially cylindrical shell 2, closed at the opposite ends by lower 3 and upper 4 bottoms respectively, is globally and schematically indicated with 1.

The lower bottom 3 is equipped with a mouth 5 for the discharge of the reaction products, whereas the upper bottom 4 is equipped with an opening 6 for the input of the reactants.

Inside said shell 2 a reaction zone 8 is defined, representatively situated between an upper line 9 and a lower line 10, to hold a predetermined catalytic bed 11 (supported in a per se known way and therefore not represented).

Inside said reaction zone 8, and in particular in said catalytic bed 11, a plurality of flat, boxed, plate-shaped heat exchangers 12 having the shape of a parallelepiped is positioned.

Such exchangers 12 are arranged axially in the shell, and have long sides 20, 20a (FIG. 3) parallel to the axis A-A, long faces parallel to the diameter B of the shell and short sides 21 at the top and bottom of the exchangers 12 which extend parallel to the same diameter B of the shell 2.

In particular, to better illustrate the arrangement of such exchangers inside the reaction zone 8, a first exchanger 12 positioned close to the shell 2 is indicated with 12a.

The exchanger 12a has the short side of a predetermined length, extending symmetrically with respect to a diameter C perpendicular to the quoted diameter B.

The opposite ends of said short side, which substantially coincide with the ends, for example the upper ends, of the long sides of the same first exchanger, are arranged on circumferences Z, $Z^1$ respectively, which have the same radius as the inner radius of the shell 2 and the center on the said diameter B.

Figure 4:
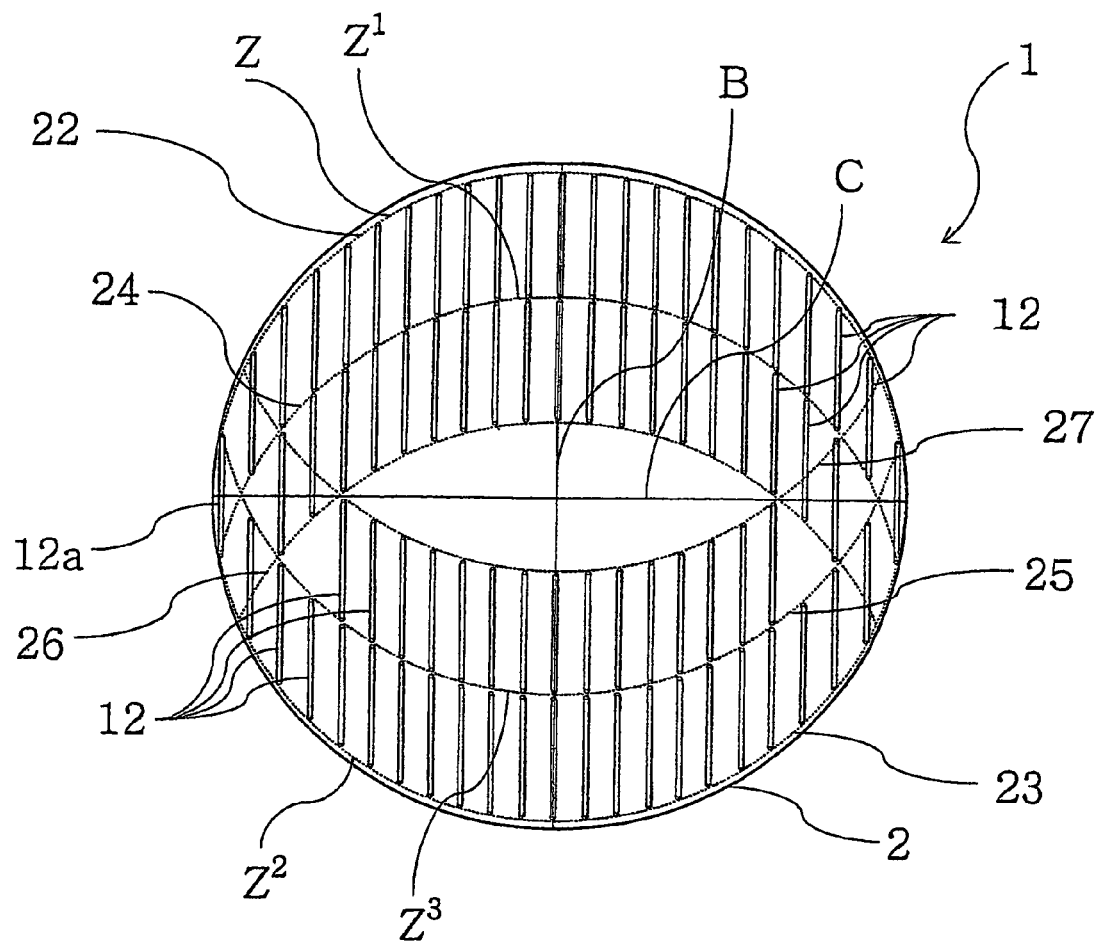
FIG. 4 schematically shows a horizontal section view of the chemical reactor of FIG. 1.

Consequently, the long sides 20, 20a of said first exchanger 12a, are arranged (FIG. 2 and FIG. 4) on imaginary cylindrical surfaces 22 and 24 with its axis parallel to the main axis of the reactor and, in the aforementioned FIGS. 2 and 4, being in horizontal section, coincide with the circumferences Z, $Z^1$.

The long sides 20, 20a could be compared to generatrices of such imaginary cylindrical surfaces 22 and 24.

The vertical sides 20 and 20a of a first series of exchangers 12 identical to the exchanger 12a, all having parallel short sides of the same predetermined length, belong to the same imaginary cylindrical surfaces 22 and 24, respectively (FIG. 4).

A second series of heat exchangers 12, all having parallel short sides of the same predetermined length is arranged with vertical sides 20 and 20a belonging respectively to the imaginary cylindrical surface 24 and to the imaginary cylindrical surface 26.

Such a cylindrical surface 26 has its axis parallel to the axis A-A of the reactor (and therefore parallel to the axis of the cylindrical surfaces 22 and 24) and passing through the diameter B of the shell 2; moreover, along the same diameter B, the distance between the cylindrical surfaces 24 and 26 and the distance between the cylindrical surfaces 22 and 24 is the same.

Advantageously, the length of said short sides of the exchangers 12 is sized in such a way as to allow easy passage of the exchangers 12 themselves through a manhole opening provided in the upper bottom 4. Such a manhole opening could be the same opening 6 or else an additional opening in the upper bottom 4, not represented.

The opposite ends of the short side of the aforementioned exchanger 12a are also arranged on circumferences $Z^2$, $Z^3$ respectively, symmetrical to the circumferences Z, $Z^1$ with respect to the aforementioned diameter C.

Consequently, the long sides 20, 20a of said first exchanger 12a, are arranged (FIG. 2 and FIG. 4), as well as on imaginary cylindrical surfaces 22 and 24, also on imaginary cylindrical surfaces 23 and 25 (which, in the aforementioned FIGS. 2 and 4, coincide with the circumferences $Z^2$, $Z^3$), symmetrical to the cylindrical surfaces 22 and 24 with respect to a plane through the diameter C and the vertical axis A-A.

The vertical sides 20 and 20a of a third series of exchangers 12, all having parallel short sides of the same predetermined length, belong respectively to the same imaginary cylindrical surfaces 23 and 25 (FIG. 4).

A fourth series of heat exchangers 12, all having parallel short sides of the same predetermined length is arranged with the vertical sides 20 and 20a belonging respectively to the imaginary cylindrical surface 25 and of an imaginary cylindrical surface 27.

Such cylindrical surface 27 has its axis parallel to the axis A-A of the reactor (and therefore parallel to the axis of the cylindrical surfaces 23 and 25) and passing through the diameter B of the shell 2; moreover, along the same diameter B, the distance between the cylindrical surfaces 25 and 27 and the distance between the cylindrical surfaces 23 and 25 is the same.

According to a preferred embodiment, said exchangers 12 are arranged on equally spaced parallel imaginary planes.

Moreover, according to a further preferred embodiment, on each of said parallel planes a plurality of heat exchangers 12 is generally arranged, still respecting the constraint of the arrangement of the long sides 20, 20a on the imaginary cylindrical surfaces 22 and 23.

Said exchangers 12 are equipped, above and below, with fittings, 13 and 14 respectively, which allow fluid communication, above with distribution ducts 15 and below with collector ducts 16.

The distribution ducts 15 are in turn in fluid communication with at least one supply duct 17, whereas the collector ducts 16 are in fluid communication with at least one discharge duct 18.

Moreover, an axial manhole passage 19 is centrally defined to ease the assembly and maintenance operations of the reactor.

A chemical reactor of the aforementioned type advantageously allows to control effectively the pseudo-isothermicity of the reaction in every point of the reactor, allowing at the same time the use of plated exchangers generally of the same size.

The invention thus conceived is susceptible to further variants and modifications all of which are within the capabilities of the man skilled in the art and, as such, fall within the scope of protection of the invention itself, as defined by the following claims.

The invention claimed is:

1. An axial pseudo-isothermal chemical reactor, comprising a substantially cylindrical shell defining a vertical axis (A-A), closed at the opposite ends by upper and lower bottoms respectively, a reaction zone, defined in said shell and in which a catalytic bed and a plurality of heat exchangers are supported,
    wherein all of the heat exchangers supported in said reaction zone are identical, flat, boxed, plate-shaped heat exchangers, having the shape of a parallelepiped and having vertical long sides, and short sides extending parallel to a same diameter (B) of the shell,
    wherein the vertical long sides of the heat exchangers are arranged on imaginary cylindrical surfaces having the same radius as the inner radius of the shell and having centers all arranged along said same diameter (B) of the shell,
    wherein at least two of said exchangers are arranged on a same imaginary cylindrical surface of said imaginary cylindrical surfaces, said plurality of heat exchangers centrally defining an axial manhole passage.

2. The chemical reactor according to claim 1, wherein said exchangers are arranged on equally spaced parallel planes.

* * * * *